United States Patent
Tatsumi et al.

(10) Patent No.: US 8,693,829 B2
(45) Date of Patent: Apr. 8, 2014

(54) EXTENSIBLE OPTICAL SIGNAL TRANSMISSION CABLE

(75) Inventors: Shunji Tatsumi, Tokyo (JP); Hiroyuki Makino, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 270 days.

(21) Appl. No.: 13/142,233

(22) PCT Filed: Dec. 25, 2009

(86) PCT No.: PCT/JP2009/071665
§ 371 (c)(1),
(2), (4) Date: Jun. 24, 2011

(87) PCT Pub. No.: WO2010/074259
PCT Pub. Date: Jul. 1, 2010

(65) Prior Publication Data
US 2011/0262086 A1    Oct. 27, 2011

(30) Foreign Application Priority Data
Dec. 26, 2008 (JP) ................................. 2008-335322

(51) Int. Cl.
*G02B 6/44* (2006.01)
(52) U.S. Cl.
USPC ........................................................ 385/100
(58) Field of Classification Search
None
See application file for complete search history.

(56) References Cited

U.S. PATENT DOCUMENTS

| 4,782,196 A | | 11/1988 | Ukai | |
|---|---|---|---|---|
| 4,966,434 A | * | 10/1990 | Yonechi et al. | 385/103 |
| 5,339,378 A | * | 8/1994 | Simonds et al. | 385/100 |
| 6,415,085 B1 | | 7/2002 | Graham et al. | |
| 2006/0257086 A1 | * | 11/2006 | Ohsono et al. | 385/123 |

FOREIGN PATENT DOCUMENTS

| DE | 41 09 147 A1 | 9/1992 |
|---|---|---|
| JP | 55-53806 | 4/1980 |
| JP | 59-82210 | 6/1984 |
| JP | 59-168703 | 11/1984 |
| JP | 61-006814 | 1/1986 |

(Continued)

OTHER PUBLICATIONS

Decision to Grant a Patent for KR Patent Application No. 10-2011-7008671 dated Oct. 24, 2012.

(Continued)

*Primary Examiner* — Sung Pak
(74) *Attorney, Agent, or Firm* — Finnegan, Henderson, Farabow, Garrett & Dunner, L.L.P.

(57) ABSTRACT

Disclosed is an extensible optical signal transmission cable having an extensity of 10% or more and an optical transmission loss of less than 20 dB/m when the cable is loosened. The cable comprises an elastic cylinder having the extensity of 10% or more and at least one optical fiber wound around the elastic cylinder. The optical fiber has a bending diameter (R) which is not smaller than the bending limit diameter (Re). The extensible optical signal transmission cable is compliant with shape deformation, can transmit an optical signal when the cable is extended or contracted, and can be used in repetitive extension and contraction.

13 Claims, 4 Drawing Sheets

(56) References Cited

FOREIGN PATENT DOCUMENTS

| | | |
|---|---|---|
| JP | 61-163513 | 7/1986 |
| JP | 1 270015 | 10/1989 |
| JP | 9-171129 | 6/1997 |
| JP | 2002-313145 | 10/2002 |
| JP | 4116935 | 4/2008 |
| JP | 2009-54312 | 3/2009 |
| KR | 1989-0003140 | 8/1989 |
| KR | 10-2010-0000036 | 1/2010 |

OTHER PUBLICATIONS

International Search Report from the Japanese Patent Office in International Application No. PCT/JP2009/071665 mailed Mar. 30, 2010.
Office Action for corresponding KR Application No. 10-2011-7008671 dated May 16, 2012.
European Search Report for EP Application No. 09835055.6 dated Jun. 6, 2012.

* cited by examiner

EXTENSIBLE OPTICAL SIGNAL TRANSMISSION CABLE

TECHNICAL FIELD

The present invention relates to an extensible optical signal transmission cable having extensity and being superior in optical signal transmission property.

BACKGROUND ART

There are two types of signal transmission cables; what is called the one using an electrical signal, and the one using an optical signal.

The one using the electrical signal is easy to handle and a general purpose-type, however, has defect in having limitation in high speed transmission and is weak against an electromagnetic interference. The optical signal has advantage of being capable of transmitting in high speed and also not receiving the electromagnetic interference. As a medium for transmitting the optical signal, an optical fiber is used, however, it is generally rigid and inferior in handling. Accordingly, it is used in many cases as a fixed wiring. As the one which has improved this drawback, there is an optical fiber curl cord (hereinafter, see PATENT DOCUMENT 1).

However, the curl cord has a problem of large outer diameter, easy catching of a curled part, and easy hanging when it is held horizontally, and is not an article with sufficiently enhanced handling.

On the other hand, in recent years, development of a robot or a wearable electronic device is significant, and such a case has been increasing that requires to instantaneously communicate (that is, high speed signal transmission) an image (moving image) obtained using a camera with a calculator (computer). In particular, in the wearable electronic device, since the optical fiber is rigid and does not deform with following the actions, there has been a problem that it cannot provide a wiring which fits to a body and thus has poor wearing feeling.

To solve such a problem, such an optical fiber cable has been required that has compliance with shape deformation, and is not caught or entangled in deforming, and can transmit an optical signal even in a deformed state, and has straight shape which can be used in repetitive extension and has extensity.

PRIOR ART DOCUMENTS

Patent Documents

PATENT DOCUMENT 1: JP No. 4116935

SUMMARY OF INVENTION

Problem to be Solved by the Invention

Problem to be solved by the invention is to provide the extensible optical signal transmission cable that has compliance with shape deformation, can perform optical transmission even in a deformed state, and can be used in repetitive use.

Means for Solving Problem

The present inventors have intensively studied on an optical transmission cable which deforms with following the various kinds of movements and resistant to repetitive use, and as a result, found that an extensible optical signal transmission cable having an extensity of 10% or more and an optical transmission loss of less than 20 dB/m when the cable is loosened, characterized in that the cable comprises an elastic cylinder having the extensity of 10% or more and at least one optical fiber wound around said elastic cylinder, and bending diameter R of the optical fiber is not smaller than limit bending diameter Re, can solve the above problem, and have completed the present invention.

That is, the present invention provides the following invention.

[1] An extensible optical signal transmission cable having an extensity of 10% or more and an optical transmission loss of less than 20 dB/m when the cable is loosened, characterized in that the cable comprises an elastic cylinder having the extensity of 10% or more and at least one optical fiber wound around said elastic cylinder, and bending diameter R of said optical fiber is not smaller than limit bending diameter Re.

[2] The extensible optical signal transmission cable according to the above [1], further comprising a constrained filament wound in a reversed direction of the optical fiber at the outer side of an optical fiber.

[3] The extensible optical signal transmission cable according to the above [1], further comprising a constrained filament wound in a reversed direction of the optical fiber by alternately passing through the outer side and the inner side (elastic cylinder side) of the optical fiber, wherein variation Rr (Rr=Rmax−Rmin) of bending diameter is $0 \leq Rr \leq Rave$.

[4] The extensible optical signal transmission cable according to any one of the above [1] to [3], wherein residual torque rate of an optical fiber is 70% or less.

[5] The extensible optical signal transmission cable according to any one of the above [1] to [4], wherein Rmin>Re and $0 \leq Rr \leq Rave$ in an arbitrary extended state till extension limit.

[6] The extensible optical signal transmission cable according to any one of the above [1] to [5], wherein winding diameter of an optical fiber is 0.5 to 30 mm, and winding pitch of the optical fiber is 0.5 to 50 mm.

[7] The extensible optical signal transmission cable according to any one of the above [1] to [6], further comprising at least one conductor wire.

[8] The extensible optical signal transmission cable according to any one of the above [1] to [7], wherein at least one or more conductor wire is further wound.

[9] The extensible optical signal transmission cable according to the above [7] or [8], wherein at least one or more optical fiber and at least one or more conductor wire are further wound concentrically.

[10] The extensible optical signal transmission cable according to the above [7] or [8], wherein at least one or more optical fiber and at least one or more conductor wire are wound in the same circumference and in parallel.

[11] The extensible optical signal transmission cable according to any one of the above [1] to [10], further comprising an external covering layer made of a fiber, at the outer periphery of an optical fiber.

[12] The extensible optical signal transmission cable according to any one of the above [1] to [11], further comprising an external covering layer made of a resin having rubber elasticity, at the outer periphery of an optical fiber.

[13] The extensible optical signal transmission cable according to any one of the above [1] to [12], comprising one or more extension resistant filament with a total length smaller than an optical fiber, wherein breaking strength of said filament in total is 10000 cN or more, when said filament is extended to a value defined by the following expression:

$$100(L_0-Lk)/Lk[\%]$$

wherein $L_0$ represents total length of the optical fiber; and $Lk$ represents total length of the extension-resistant filament.

[14] The extensible optical signal transmission cable according to any one of the above [1] to [13], wherein 20% extension load is below 5000 cN, and 20% extension recovery rate is 80% or more.

[15] A method for producing the extensible optical signal transmission cable according to any one of the above [2] to [14], characterized in that at least one or more optical fiber is wound around an elastic cylinder in an extended state, and a constrained filament is wound around the outer side of said optical fiber in a opposite direction to said optical fiber, using an apparatus having function for extending the elastic cylinder, function for winding a plurality of transmission wires in parallel around the elastic cylinder, and function for winding the filament in a reversed direction to a winding direction of the transmission wires.

[16] A method for producing the extensible optical signal transmission cable according to any one of the above [3] to [15], characterized in that at least one optical fiber and at least one filament are wound around a elastic cylinder in the same direction in an extended state of the elastic cylinder, and still more, at least one constrained filament is wound by alternately passing through the outer side and the inner side (the elastic cylinder side) of one or a plurality of the optical fibers, in a reversed direction to said optical fiber, using an apparatus having function for extending the elastic cylinder, function for winding at least one transmission wire and at least one filament around said elastic cylinder in the same direction, and function for winding at least one constrained filament in a reversed direction to the above direction.

Effects of the Invention

The extensible optical signal transmission cable of the present invention can transmit a high speed signal without being disturbed and attenuated, as well as has extensity and compliance with shape deformation, and thus is useful as a transmission cable for a robot or a wearable electronic device.

EMBODIMENTS FOR CARRYING OUT THE INVENTION

Explanation will be given below specifically on the present invention. Firstly, explanation will be given on symbols to be used in the present invention.

Optical fiber diameter: d (mm).

Optical fiber winding diameter: D (mm). Dmin and Dmax represent minimum diameter and maximum diameter, respectively.

Optical fiber winding outer diameter: Do (mm)

Optical fiber winding pitch: P (mm). Pmin and Pmax represent minimum pitch and maximum pitch, respectively.

Optical fiber bending diameter: R (mm). Rmin, Rmax, Rave and Re represent minimum diameter, maximum diameter, average diameter and limit bending diameter, respectively.

Transmission loss: L (dB), Ls represents transmission loss in extension.

Transmission property in extension: I.

Load: T (cN).

Extension rate: E (%).

In the extensible optical signal transmission cable of the present invention, in order to transmit the optical signal without being disturbed and attenuated even in repetitive use, it is important that change of bending diameter of the optical fiber is small over the whole length even under extension and contraction. In addition, in order to make extensity express, it is necessary that the optical fiber with high flexibility is integrated with a structure having extensity.

The extensible optical signal transmission cable of the present invention is required to express the extensity of 10% or more. The extensity is preferably 20% or more, and still more preferably 30% or more. The extensity of below 10% provides poor compliance with deformation, and cannot attain the above object. The extensity in the present description means the one having a recovery rate of 50% or more by loosening after extended to a predetermined level, for example, 10%.

The extensible optical signal transmission cable of the present invention aims at using as a wire going through a part corresponding to a joint, because of being used as a wire of an articulated robot or a wearable electronic device. Therefore, length is set at 1 m only as a guide. In addition, it is necessary that the optical transmission loss is less than 20 dB/m, as high speed signal transmission. The optical transmission loss of this level or more deteriorates transmission property, and thus not suitable for optical signal transmission. It is preferably 10 dB/m or less, more preferably 6 dB/m or less, and particularly preferably 3 dB/m or less. The transmission loss in the present invention means a value determined by, what is called, a cut back method.

Figure 1:
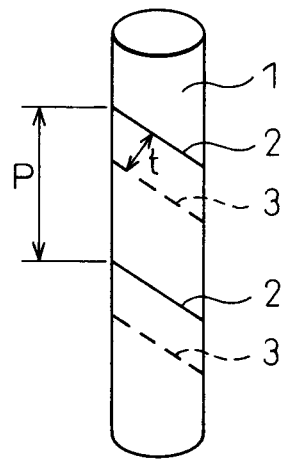
FIG. 1 is a schematic drawing of the extensible optical signal transmission cable of the present invention when the cable is loosened.
Figure 2:
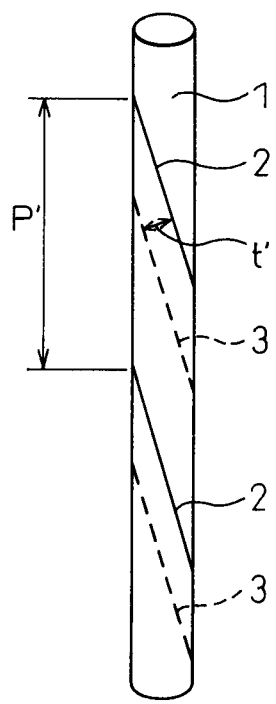
FIG. 2 is a schematic drawing of the extensible optical signal transmission cable of the present invention when the cable is extended.

The extensible optical signal transmission cable of the present invention, as shown in FIG. 1 and FIG. 2, is composed of a transmission body part comprising an elastic cylinder (1) having the extensity of 10% or more and at least one optical fiber cable (2 and 3) wound around said elastic cylinder in the same direction. Still more, it is preferable to have an external covering layer at the outer periphery of the transmission body part (the external covering layer is not shown).

It should be noted that at least a part of the optical fiber may be present at the inside of the surface layer of the elastic cylinder.

The elastic cylinder can be formed of an elastic filament yarn, an elastic tube, a coil spring or the like.

In addition, it is preferable that the elastic cylinder has voids inside. The voids have effect to enhance extensity, because they can increase winding diameter of the optical fiber without inhibiting extensity. A method for forming the voids includes, for example, a method for arranging insulating fibers around the elastic filament yarn; a method for knitting the elastic filament yarns or filaments arranged with the insulating fiber around the elastic filament yarn; a method for foaming the elastic filament yarn; a method for making the elastic filament yarn hollow; and a method for combining these. In the case when formed from an elastic tube or a coil spring, it naturally provides a hollow type.

The elastic filament yarn to be used for forming the elastic cylinder is necessary to have the extensity of 10% or more. It is preferable to have the extensity of 50% or more. The extensity below 50% lacks extension performance and increases load in extending and contracting the extensible optical signal transmission cable. It is still more preferable to use the elastic filament yarn having the extensity of 100% or more, and particularly preferable to use the elastic filament yarn having the extensity of 300% or more.

The elastic filament yarn to be used in the present invention is not especially limited as for kind of a polymer, as long as it is the one superior in extensity to a degree as described above. For example, there are included a polyurethane-based elastic filament yarn, a polyolefin-based elastic filament yarn, a polyester-based elastic filament yarn, a polyamide-based elastic filament yarn, a natural rubber-based elastic filament yarn, a synthetic rubber-based elastic filament yarn, and a composite rubber-based elastic filament yarn of natural rubber and synthetic rubber, and the like.

The polyurethane-based elastic filament yarn is most suitable as the elastic filament yarn of the present invention, due to having large elongation and is also superior in durability.

The natural rubber-based elastic filament yarn has advantage in that stress per cross-sectional area is small as compared with other elastic filament yarns, and easily provides the extensible optical signal transmission cable showing extension and contraction under low stress. However, it deteriorates easily and thus is difficult to retain extensity for a long period of time. Therefore, it is suitable for applications aiming at use for a short period of time.

The synthetic rubber-based elastic filament yarn is superior in durability. Silicone rubber is superior in both elongation and durability, and thus is used preferably. In addition, fluororubber is superior in durability and inflammability, although it has small elongation. Well-known synthetic rubber-based elastic filament yarn may be used in response to applications.

The elastic filament yarn may be a monofilament or a multifilament.

Diameter of the elastic filament yarn is preferably in a range of 0.01 to 30 mm, more preferably 0.02 to 20 mm, and still more preferably 0.03 to 10 mm. The diameter of 0.01 mm or less does not provide extensity, whereas the diameter over 30 mm requires large force to extend.

By fabricating the elastic filament yarn so as to make a two-ply yarn, or a multi-yarn twist, in advance, or by using the elastic filament yarn as a core and winding other elastic filament yarn around it, it is possible to make easy integration of the elastic cylinder and the transmission body part (that is, the transmission body part is not dislocated under extension and contraction).

A coil spring to be used in the present invention to form the elastic cylinder may be the coil spring made of other than a metal or the coil spring made of a metal. The metal coil spring does not deteriorate even under high temperature and thus is suitable for applications to be used under high temperature environment. A spring with coil shape can be designed arbitrarily by selection of a coiling machine and condition setting of the coiling machine selected.

The coil spring by itself cannot wind a conductor wire around the coil spring, therefore, the elastic cylinder can be obtained by forming in advance a knitting of the insulating fiber or the like at the circumference of the coil spring.

It is preferable that coil diameter Cd and a wire drawing (this means a wire rod for forming the coil) diameter Sd satisfy $24 > Cd/Sd > 4$. The case where Cd/Sd is 24 or more does not provide a spring with stable shape, and tends to provides easy deformation, and thus is not preferable. Preferably, Cd/Sd is 16 or less. On the other hand, the case where Cd/Sd is 4 or less makes difficult to form the coil, and at the same time makes expression of extensity difficult. Preferably, Cd/Sd is 6 or more.

Diameter of the wire drawing Sd is preferably 3 mm or less. The case where the diameter is 3 mm or more provides a heavy spring, and increases extension stress, and also increases coil diameter, and thus is not preferable. On the other hand, the case where the diameter of the wire drawing is 0.01 mm or less provides too weak spring formable and easy deforming when a force is applied laterally, and thus is not practical.

A pitch interval of a coil is desirably ½ Cd or less. The coil-like spring can be formed even with an interval not smaller than this level, however, it makes difficult to form a knitting of the insulating fiber or the like to the outer periphery of the coil. Further, when extensity decreases, it makes easy deformation by external force, and thus is not preferable. The pitch interval of the coil is preferably 1/10 Cd or less.

The one having the pitch interval of nearly zero has characteristics that extensity can be increased to the highest degree, entanglement of the spring itself becomes difficult, and the spring wound is pulled out easily, and has advantage of being resistant to deformation caused by external force, and thus is preferable.

Coil diameter is preferably in a range of 0.02 to 30 mm, more preferably 0.05 to 20 mm, and still more preferably 0.1 to 10 mm. Production of the coil having outer diameter of 0.02 mm or less is difficult, whereas the outer diameter over 30 mm provides too large winding diameter of the optical fiber, and thus is not preferable.

A material of the coil spring may be selected arbitrarily from known wire drawings. The material of the wire rods include a piano wire, hard steel wire, stainless steel wire, oil tempered wire, phosphor bronze wire, beryllium copper wire and nickel silver wire and the like. The stainless wire is desirable in view of superior corrosion resistance and heat resistance, along with easy availability.

An elastic tube has voids in the inside and may be used either as the elastic cylinder as it is, or also make the elastic cylinder by forming a fiber layer at the outer layer of the elastic tube. It is preferable to form the fiber layer at the outer layer of the elastic tube, because the elastic tube is easily bruised when the optical fiber and the elastic tube contact directly.

In addition, it is also possible to embed the optical fiber in the elastic tube. For example, the optical fiber can be embedded in the elastic tube, by winding the optical fiber around a stainless steel bar, which is then immersed in or applied with rubber latex, and then carrying out a known method (for example, vulcanization, heat treatment and drying treatment or the like), and then pulling out the stainless steel bar in the inside, or the like.

An extensity of the elastic cylinder is required to be 10% or more, preferably 30% or more, and more preferably 50% or more. The extensity of as low as below 30% may provide the transmission cable with low extensity, due to decrease in elongation caused by covering of the transmission body part and the external covering layer.

20% extension load of the elastic cylinder is preferably 2000 cN or less, more preferably 1000 cN or less, and still more preferably 500 cN or less.

A diameter of the elastic cylinder is 30 mm or less, more preferably 20 mm or less, and still more preferably 10 mm or less. The diameter of 30 mm or more makes the elastic cylinder larger and heavier, and thus is not preferable practically.

20% extension stress of the elastic cylinder is designed to be 1 to 500 cN/mm$^2$, more preferably 1 to 200 cN/mm$^2$, and still more preferably 5 to 100 cN/mm$^2$.

Good extensity can be obtained by designing so as to be within the above range.

As the optical fiber to be used in the present invention, a flexible optical fiber with good transmission property is preferable. As the one having small transmission loss even in small bending diameter, there has been known a holey-type having multiple holes around the core, or a multi-core-type divided to multiple fine wires. In the present invention, as a glass optical fiber, the holey-type is used preferably, and as a plastic optical fiber, the multi-core-type is used preferably.

The glass optical fiber has advantage that has high transmittance, can make small diameter and can achieve compact sizing of a connector, whereas, it has defect of relatively large bending diameter and easy breakage. On the other hand, the plastic optical fiber has advantage of being soft and easy to bend, whereas, it has defect of relatively low transmittance, and large diameter which essentially requires large connector part. Accordingly they can be properly used depending on applications by utilizing each of the characteristics. In any of the above cases, it is preferable to use one having both transmission property and flexibility.

An optical fiber composing a signal wire may be used alone as a naked wire, however, it decreases transmission property when it is bruised. The optical fiber with a single core may also be used, however, it has inferior flexibility.

In the plastic optical fiber, it is preferable to use the multi-core-type optical fiber which is composed of an assembled wire of fine wires. In addition, in the glass optical fiber, the holey-type having a plurality of air holes around the core is preferable.

The upper limit of the multi-number of the multi-core and the upper limit of the number of the air holes of the holey-type are not especially limited, and can be determined arbitrarily in consideration of flexibility and transmission property. Increase in the number increases diameter thereof, therefore, it is preferably 10000 or less, and more preferably 1000 or less.

A single wire diameter of fine wire composing the multi-core is preferably 0.1 mm or less, and more preferably 0.08 mm or less, and still more preferably 0.05 mm or less. By making finer wire, flexibility can be enhanced, however, too fine wire makes production difficult, and thus it is preferably 0.001 mm or more.

There have been known various methods for preparing the multi-core, and any of the known methods may also be used in the present invention.

For example, as a wearable cable, a length of about 1 m is required, and because of transmission within a short distance, transmission is possible even in low transmittance. Therefore, by using a multi-core (for example, 37 pieces) plastic optical fiber with a diameter of 1 mm or less, winding diameter can be decreased, and thus the compact extensible optical signal transmission cable having superior extensity and being difficult to break even in repetitive use can be obtained.

An optical fiber has a diameter d (mm) of $3>d>0.1$, and the shape deformation Re (mm) of preferably $30>Re>0.5$, more preferably $2>d>0.1$ and $20>Re>0.5$, and still more preferably $1>d>0.1$ and $10>Re>0.5$.

The one with small diameter and small bending diameter has advantage of being compact, superior in extensity, having good compliance with shape deformation, resistance to repetitive extension and contraction and small variation of transmission property even in deformation.

By covering the optical fiber with an assembly of fibers, a sheath of the optical fiber can also be protected. The fiber is not especially limited, and a polyester fiber and a nylon fiber are included as those which are low price, having high strength and superior handling. It is also possible to use a fiber superior in flame retardancy such as a fluorofiber and a saran fiber, or a fiber with high strength such as an aramid fiber and a polysulfone fiber, or a polypropylene fiber or the like.

It is also possible to use a fiber with water-repellent treatment or flame-retardant treatment, in advance.

The extensible optical signal transmission cable of the present invention can be obtained by winding one or more optical fiber around the elastic cylinder having the extensity of 10% or more.

It is also possible to make what is called a multi-core optical fiber cable or an electro-optical composite cable by using two or more optical fibers or by using one or more conductor wire together as will be described later.

In order to obtain the electro-optical composite cable, it is necessary that the conductor wires include a length of 1.2 times or more relative to cable length in a loosened state. The case where the length is shorter than this inhibits extensity of the cable.

In order to obtain a cable with superior extensity, it is preferable that the conductor wires are wound in a helix state.

The helix state is obtained, for example, by winding in one direction, or by winding in both S/Z directions using a covering machine.

The conductor wire and the optical fiber can be wound on the same circumference, or wound in a multi-layer in a concentric way.

In the case of winding on the same circumference, it is preferable to be wound in parallel.

"In parallel" means a state of winding in the same direction without overlapping by crossing of the transmission wires (the optical fiber and conductor wires) each other, preferably without overlapping even partially. The overlapped part causes break of a wire in repetitive extension and contraction, and thus is not preferable. In addition, by winding in parallel, it becomes easy to obtain the compact extensible optical signal transmission cable with superior extensity.

One or more optical fibers are necessary to be used. In general-purpose cases, there are used 1, 2, 3, 4 and 5 to 10 fibers or the like. The upper limit thereof is not especially limited, however, 10 or more fibers tends to inhibit extensity. It is preferably within 8, and more preferably 1 to 4.

As will be described later, in the case where the conductor wire is included together with the optical fiber, the optical fiber can be used as a signal line, and the conductor wire as a power source line or the signal line.

As a cable with high versatility, the one having both the signal line and the power source line is preferable. For example, combination of three in total of one optical signal line, one power source line and one ground line enables to provide the extensible optical signal transmission cable having both signal transmission by optical communication, and power source supply. The conductor wire may be used in combination as the signal line. At least one signal line is necessary, and preferably two. Use of the two signal lines makes possible to transmit a general purpose differential signal as well. By comprising two conductor wires for power source supply, two conductor wires for high frequency transmission and one to two optical fibers, all of a power, a high frequency signal and an optical signal can also be transmitted at the same time.

In the case where the optical fiber and also the conductor wire as will be described later, it is preferable that the optical fiber and the conductor wire are constrained by a constrained filament at one or more places per each round of winding. The case of non-constraint tends to bias winding pitch by extension and contraction and tends to decrease transmission property and/or extensity.

As for the constrained filament, a known filament may be used. For example, a multifilament, a monofilament or a spun yarn may be used. In view of thinness, softness, high constraining force (high strength) and inexpensiveness, a polyester fiber and a nylon fiber are included. In view of low dielectric constant, a fluorofiber, a polyethylene fiber and a polypropylene fiber are included. In view of flame retardancy, a polyvinyl chloride fiber, a saran fiber and a glass fiber are included. In view of extensity, a polyurethane fiber or the polyurethane fiber covered with other insulating fiber at the outer part, and the like are included. In addition, silk, a rayon fiber, a cupra fiber, a cotton spun fiber may also be used. However, it is not limited to these, and a known fiber may be used arbitrarily.

By winding the optical fiber in one direction (for example, in Z direction), and by winding the filament thereon in a reversed direction (S direction), the optical fiber can be constrained to prevent dislocation caused by extension and contraction.

Figure 3:
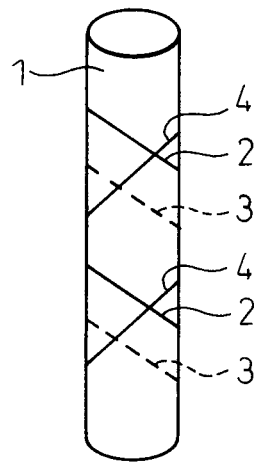
FIG. 3 is a drawing showing one example of a winding method of a constrained filament of the extensible optical signal transmission cable of the present invention.

As shown in FIG. 3, in the case where the constrained filament is wound at the outer side of the optical fiber using a covering machine, winding tension (ballooning tension) increases and constraining force can be enhanced, by increasing winding speed (increasing rotation number of a spindle).

Figure 4:
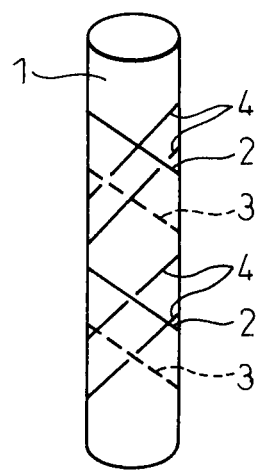
FIG. 4 is a drawing showing another example of a winding method of a constrained filament of the extensible optical signal transmission cable of the present invention.

Still more preferably, as shown in FIG. 4, the optical fiber is constrained by winding the filament by passing the inner side (the elastic cylinder side) and the outer side of the optical fiber in a reversed direction of the optical fiber. By winding the constrained filament in a reversed direction to the optical fiber by alternately passing through the inner side and the outer side of the optical fiber, such a extensible optical signal transmission cable can be obtained that has small change of winding pitch in tensioned and loosed states, even by repetitive extension and contraction or flexing action accompanying with extension and contraction, and also small change of winding pitch caused by repetitive extension and contraction. In the case of winding by alternately passing through the outer side and the inner side of a plurality of the optical fibers, the optical fiber may be passed alternately one by one, or a plurality of optical fibers may be passed alternately together.

The relevant filament is preferably the one with finer diameter than the optical fiber. Use of the larger filament provides little extension and contraction, because the optical fiber itself is forced to deform.

In order to enhance constraining force, it is preferable to wind the filament by alternately passing through the inner side and the outer side of the optical fiber, so as to have constrained points at one or more places, preferably four or more places, and more preferably eight or more places, per one round.

By applying the load onto a filament to be wound, winding tension can be enhanced and constraining force can be increased. The load is preferably adjusted by observing a winding state. Too small load may decrease mutual constraining force, which may vary winding pitch of the optical fiber by extension. Too strong load fastens strongly the optical fiber itself from the side surface, which may decrease transmission property.

In addition, it is also possible to wind the above constrained filament, by alternately passing through the inner side and the outer side thereof, with the optical fiber and the intervened filament all together, or separately, by intervening the constrained filament so that position of the optical fiber does not dislocate. By this intervened substance, it is also possible to control pitch of the optical fiber.

Generally, the optical fiber is rigid, which tends to generate force to loosen twisting by extension and contraction, and tends to disturb a winding state, even by winding as above so as to constrain with the constrained filament.

Accordingly, it is preferable that residual torque rate of the optical fiber is 70% or less, more preferably 50% or less, and still more preferably 30% or less. The residual torque rate means a value determined by the following expression, where N represents turn number by loosening the 10 turned optical fiber, and taking it out, and then it is stood still at room temperature for 10 minutes.

$$\text{Residual torque rate}=100*(10-N)/10(\%)$$

In order to decrease the residual torque, it is preferable to perform heat treatment after winding the optical fiber.

By heat treatment, strain caused by winding of the optical fiber can be removed, and residual torque can be reduced.

By reducing the residual torque rate, shape is stabilized, repetitive extension and contraction becomes easy, and becomes easy to return to original shape after repetitive extension and contraction. In this way, disturbance of a winding state of the optical fiber caused by repetitive extension and contraction can be prevented, to enhance practical applicability.

Heat treatment condition is set in consideration of reduction effect of the residual torque of the optical fiber, along with optical transmitting property and extensity of the optical fiber. Effective temperature is determined by measuring the residual torque rate, optical transmitting property and extensity.

Long time treatment at high temperature decreases transmission property. Still more, extensity of the elastic substance may be impaired. On the other hand, at low temperature effect of strain removal is poor.

The heat treatment is preferably performed at a temperature of 40° C. or more, more preferably 60° C. or more, and still more preferably 80° C. or more.

Treatment time is set arbitrarily in relation to temperature. By holding heat treatment for 1 second or longer, preferably for 10 second or longer, more preferably for 1 minute or longer, stable heat treatment can be performed. Long time holding at high temperature may decrease transmitting property of the optical fiber, therefore it is preferable to set decrease in the transmitting property in a range of 50% or less, more preferably 30% or less, and still more preferably 10% or less. In the case of a plastic optical fiber, temperature is preferably 150° C. or less, and still more preferably 120° C. or less. In the case of a glass optical fiber, temperature is preferably 200° C. or less. In addition, holding at high temperature for a long period of time may decrease extensity. In the case of using the elastic filament yarn as the elastic substance, for example, in silicone rubber, the temperature is preferably 180° C. or less, and in the polyurethane-type elastic filament yarn, it is preferably 150° C. or less, and in the natural rubber-type elastic filament yarn, it is preferably 130° C. or less. In addition, in the case of using a knitted substance around the coil spring as the elastic substance, the temperature is preferably set at 200° C. or lower. For example, in the case of using the polyurethane elastic filament yarn as the elastic substance, and using the plastic optical fiber as the optical fiber, by treatment for about 5 minutes to 15 minutes at 80 to 100° C., decrease in transmission property is eliminated nearly completely and the residual torque rate can be made to 70% or less.

In the case of using the glass optical fiber, in order to reduce the residual torque rate, higher temperature may be required, however, in such a case, by using silicone rubber or the coil spring with high heat resistance as the elastic substance, residual torque can be reduced without impairing extensity, while maintaining transmitting property of the optical fiber.

The extensible optical signal transmission cable of the present invention may be adhered with the optical fiber and the elastic cylinder. Usually, adhesive lacks extensity, and application so as to cover the whole elastic cylinder tends to lose extensity of the elastic cylinder. In order to prevent this, there is a method for adhering by using polyurethane having elasticity, or a method for adhering only at a contact surface of the optical fiber and the elastic cylinder, or the like.

The optical fiber is preferably wound in the same direction, and in the same pitch. Variation of pitch in a length direction varies flexion rate of the optical fiber and tends to decrease transmission property. In addition, extension and contraction tends to concentrate deformation at one place and generate a part where the optical fiber extends completely and twists and turns.

Bending diameter R (mm) of the optical fiber which is represented by the following expression, using pitch p (mm) and winding diameter D (mm) of the optical fiber to be wound, is not smaller than limit bending diameter Re, and in any of the extension range, it is preferable not to deviate from the range of $50 \leq R \leq Re$.

Figure 5:
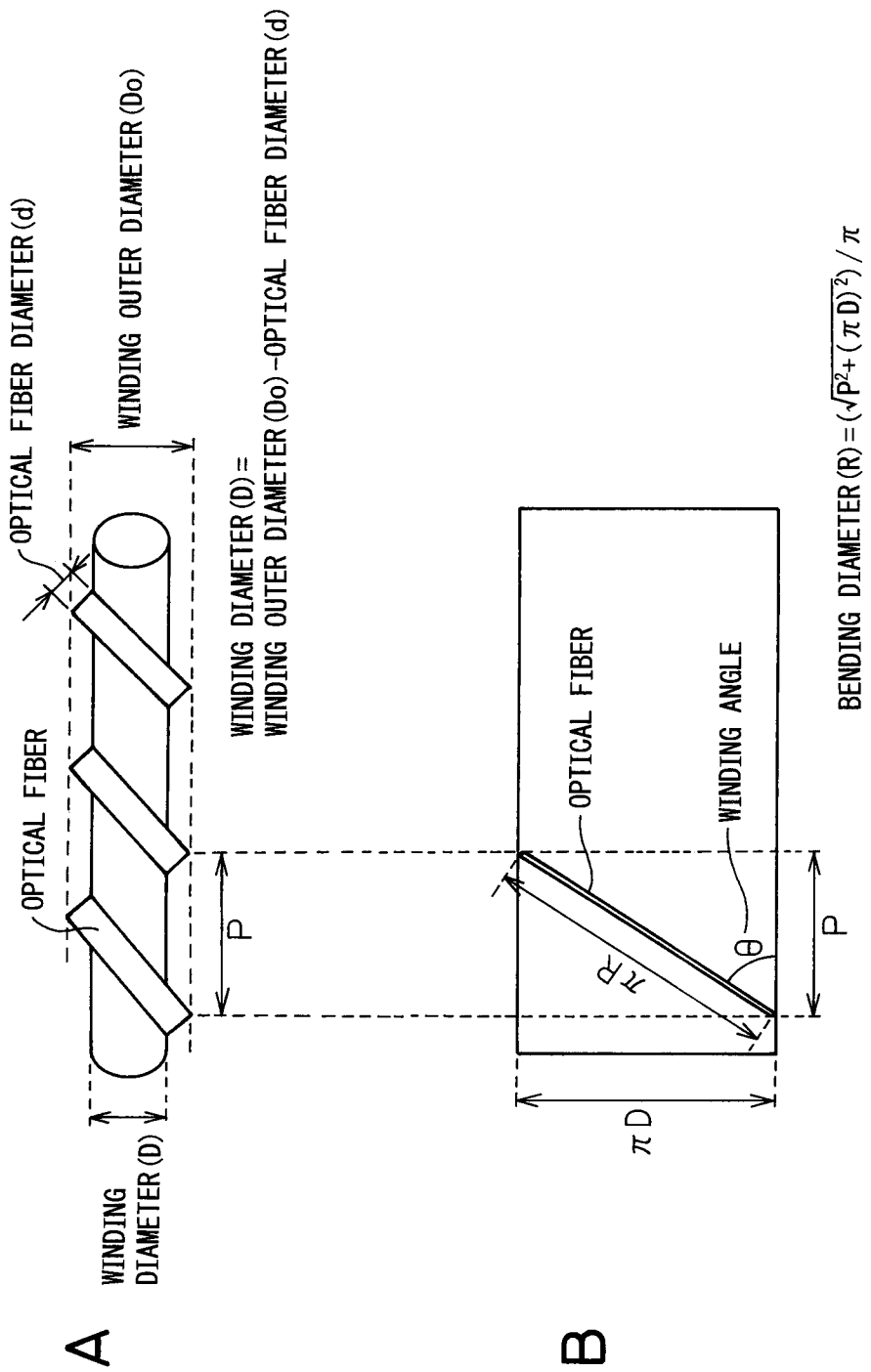
FIG. 5 is a drawing explaining bending diameter in the present invention.

FIG. 5 is a drawing explaining bending diameter referred to in the present invention. In FIG. 5, A is a schematic view of the extensible optical signal transmission cable of the present invention, and B is a developed view of the cable by cutting it in a length direction. As understood from these drawings, the bending diameter R is winding diameter in consideration of winding angle θ of the optical fiber.

The value of R over 50 mm provides too large outer diameter, or tends to impair extensity. It is more preferably 30 mm or less, still more preferably 20 mm or less, and particularly preferably 10 mm or less.

The lower limit of the bending diameter R is preferably not smaller than the limit bending diameter Re, more preferably not smaller than 2 Re, and still more preferably not smaller than 3 Re. It should be noted that a method for determining the limit bending diameter Re of the optical fiber will be described later.

The extensible optical signal transmission cable of the present invention preferably has R, in arbitrary extension to extension limit, preferably not smaller than Re, more preferably not smaller than 2Re, and still more preferably not smaller than 3Re. It is preferable not to deviate from this range even by repetitive extension. Deviation from this range either decreases transmission property or loses extensity. It should be noted that extension limit referred to in the present invention means a value obtained by multiplying 0.8 to extension rate where extension recovery rate becomes below 80%.

It is preferable that relation between average bending diameter Rave (mm) which is determined by observing a winding state at arbitrary five or more places in a loosened state, and variation Rr (Rr=Rmax−Rmin) is $0 \leq Rr \leq Rave$. The case where there is variation over Rave increases variation among pitches by repetitive extension, and generates defects in transmission property and extensity. It is more preferably ½ of Rave or less, and still more preferably ⅓ of Rave or less.

The extensible optical signal transmission cable of the present invention preferably has winding pitch (P) of the optical fiber of 0.5 to 50 mm. The case of the pitch of 0.5 mm or less provides too long length of the optical fiber to be wound and decreases transmission property. The case of the pitch of 50 mm or more generates poor extensity. The winding pitch is more preferably 1 to 20 mm, and still more preferably 2 to 10 mm.

It is preferable that winding diameter of the optical fiber is Re to 30 mm, more preferably Re to 20 mm, and still more preferably Re to 10 mm. The case of the winding diameter of 30 mm or more provides too large outer diameter accomplished, and thus is not preferable. The case of the winding diameter not more than Re makes transmission difficult.

Interval of adjacent optical fibers (t and t' in FIGS. 1 and 2), and interval of adjacent transmission wires (the optical fiber and/or the conductor wire) including also the conductor wire, in the case of containing the conductor wire as will be described later, are preferably 0.01 to 20 mm. The case of the interval of below 0.01 mm tends to bruise the sheath of the optical fiber by extension and contraction, and may have risk of decreasing transmission property. The case of the interval of 20 mm or more provides poor extensity. It is more preferably 0.1 to 10 mm, and still more preferably 0.1 to 5 mm.

By setting pitch, interval and winding diameter of the optical fiber within the above range, it becomes easy not only to obtain the compact extensible optical signal transmission cable with good extensity, but also becomes possible to maintain bending diameter R within a range of $50 \leq R \leq Re$ in repetitive extension and contraction, and it becomes easy to obtain the extensible optical signal transmission cable suitable for repetitive use.

The extensible optical signal transmission cable of the present invention may have an external covering layer. By having the external covering layer, durability enhances with protected from physical stimulus or chemical stimulus. The external covering layer is preferably formed by a fiber or an elastic resin having rubber elasticity.

Covering with a fiber is difficult to inhibit extensity and thus is suitable for applications requiring soft extensity. As the fiber, a conductive fiber or an insulating fiber can be used. As will be described later, in the case of using the conductor wire in combination, it is preferable to use the insulating fiber. The conductive fiber can be used as an outer shield layer or countermeasure for static electricity.

A water repellent insulating fiber has effect to prevent infiltration of water with high dielectric constant and thus is preferable. Specifically, it is possible to use the water repellent insulating fiber such as a fluorofiber or a polypropylene fiber, or to use a polyester fiber or a nylon fiber after furnishing water repellent treatment. A water repellent treatment agent may be selected arbitrarily from known agents. Specifically, a fluorine-based, or a silicone-based water repellent treatment agent or the like is included.

In addition, flame retardant treatment may be performed. In dyeing of polyester or nylon for outer covering, flame retardant treatment can be performed using a bromine-based or a phosphate ester-base agent (although not especially limited thereto). It is also possible to furnish flame retardant treatment, or furnish flame retardant treatment to the extensible optical signal transmission cable. It is preferable to furnish flame retardant treatment in advance to a fiber to be used.

As the fiber, a multifilament, a monofilament, or a spun yarn can be used. The multifilament has good covering property and little generates fluff, and thus is preferable.

The fiber can be selected arbitrarily from known fibers, in response to applications of the extensible transmission cable, or use condition predicted. The fiber may be used as an original yarn as it is, however, a dope dyed yarn or a dyed yarn can also be used in view of design or deterioration prevention. By finishing treatment, enhancement of flexibility or friction property can also be attained. Still more, by subjecting to known fiber finishing such as flame retardant finishing, oil repellent finishing, soil release finishing, antibacterial finishing, bacteria control finishing, deodorant finishing or the like, handling in practical use can also be enhanced.

As a fiber having both heat resistance and wear resistance, an aramid fiber, a polysulfone fiber and a fluorofiber are included. In view of fire resistance, a glass fiber, a flame resistant acrylic fiber, a fluorofiber and a saran fiber, an aramid fiber and the like are included. In view of wear resistance and strength, a high-strength polyethylene fiber and a polyketone fiber are added. In view of cost and heat resistance, a polyester fiber, a nylon fiber and an acrylic fiber are included. In addition, a flame retardant polyester fiber, a flame retardant nylon fiber, and a flame retardant acrylic fiber (a modacrylic fiber) furnished with flame retardancy to these fibers are also suitable. To prevent local deterioration caused by frictional heat, it is preferable to use a non-melting fiber. These examples include an aramid fiber, a polysulfone fiber, cotton, rayon, cupra, wool, silk, and an acrylic fiber. In the case of emphasizing strength, a high strength polyethylene fiber, an aramid fiber and a polyphenylene sulfide fiber are included. In the case of emphasizing frictional properties, a fluorofiber, a nylon fiber and a polyester fiber are included.

In the case where design is emphasized, an acrylic fiber with good chromogenic property may also be used.

Still more, in the case of emphasizing tactile impression in contact with a human body, a cellulose-based fiber such as cupra, acetate, cotton and rayon, and silk or a fine denier synthetic fiber can be used.

Covering with an elastic resin, or covering with a rubber tube is used preferably in such applications where there is a risk that liquid invades to the inside.

The elastic resin can be selected arbitrarily from various elastic insulating resins, and can be selected in consideration of applications of the extensible optical signal transmission cable, and compatibility with other fiber to be used at the same time.

Performances to be considered include transmission property, extensity, wear resistance, heat resistance and chemical resistance and the like.

As one superior in extensity, so-called a natural rubber-based elastic resin, a styrene-butadiene-based elastic resin, a silicone-based elastic resin are included.

As the one superior in wear resistance, heat resistance and chemical resistance, a synthetic rubber-based elastic material is included, and fluorine-based rubber, silicone-based rubber, ethylene-propylene-based rubber, chloroprene-based rubber and butyl-based rubber are preferable.

As the external covering layer, the one braided by a fiber and the elastic resin can also be combined.

The extensible transmission cable is required to be subjected to extension and contraction using small force in many cases, and the case of covering with only the elastic resin tends to increase thickness of the elastic resin, and tends to increase force for extension and contraction. In such a case, by combining a thin elastic resin and a braid using the insulating resin, both covering property and extensity can be made satisfied.

As the elastic resin, covering with what is called a rubber tube can also be performed. Because the rubber tube has poor frictional property in general, the exterior may further be covered with a fiber to compensate this.

The extensible optical signal transmission cable of the present invention may also be shielded. The shield is used to prevent emission and invasion of an electromagnetic wave. Therefore, it is used preferably in the case of using the conductor wire in combination. The shield can be obtained by a method for braiding with using an electric conductive organic fiber or a metal fine wire with good electric conductivity; a method for winding a tape-like substance (for example, aluminum foil) with good electric conductivity; or the like.

After winding the optical fiber around the elastic cylinder, a covering layer is composed of a fiber, and the shield layer is formed at the outer periphery thereof. The shield layer can be obtained by braiding the electric conductive organic fiber or the metal fine wire with good electric conductivity, or a combination thereof. To protect the shield layer, it is preferable to form an external covering layer at the outer layer of the shield layer.

The electric conductive organic fiber means the one having a resistivity of 1 Ω·cm or less. For example, a plated fiber, a fiber filled with electric conductive filler is included. More specifically, a silver plated fiber or the like is included.

The extensible optical signal transmission cable of the present invention preferably contains one or more extension resistant filament (total length of the extension resistant filament: Lk) with a total length smaller than the optical fiber (total length of the optical fiber: $L_0$) to prevent break of the optical fiber caused by over extension. And, it is preferable to design so that breaking strength of the extension resistant filament in total is 10000 cN or more, when the extension resistant filament is extended to 100 $(L_0-Lk)/Lk$ [%].

For example, in the case where an electric appliance with a weight of several kg is dropped accidentally, in a connected state with the extensible optical signal transmission cable of the present invention, abrupt load may be applied onto the cable. Even in such a case, by designing as above, it can be prevented that excessive load is applied onto the optical fiber, and decrease in transmission property or extensity of the extensible optical signal transmission cable can be prevented.

An extension resistant filament shorter than the optical fiber can be included in the extensible optical signal transmission cable of the present invention, by any of a method for covering the outside at a winding angle smaller than winding angle of the optical fiber; or a method for winding the extension resistant filament at a winding angle smaller than the optical fiber onto the elastic cylinder of a core; or a method for inserting the extension resistant filament along the extended elastic cylinder of a core, in winding the optical fiber. In addition, by selecting condition thereof, it can be set shorter than the optical fiber. For example, in designing winding, pitch interval becomes the bottom side of a virtual triangle; a value of winding diameter multiplied with circle ratio becomes height of the virtual triangle; and hypotenuse of said virtual triangle becomes length of the optical fiber per one virtual triangle unit. It is attained by designing so that hypotenuse of the virtual triangle of the wound optical fiber becomes shorter, by target or more, than hypotenuse of the wound extension resistant filament.

In addition, in the case where the extension resistant filament is placed along the elastic cylinder of an extended core part, it may be attained by setting extension ratio at 1.1 times or more, and placing the extension resistant filament along it without winding, and winding the optical fiber on the circumference thereof.

In the case where the extension resistant filament is placed along the elastic cylinder of a core part, it is preferable to use a high strength fiber, to attain breaking load by less number. An aramid fiber, a polyketone fiber, a PPS fiber, a high strength PE fiber, a high strength PP fiber and the like are included.

In the case of arranging the extension resistant filament by controlling winding angle, it can combine a role of the external covering, and by using a plurality of pieces, total breaking strength can be increased to 1000 cN or more. In addition to a high strength fiber, a known fiber such as a polyester fiber, a nylon fiber, an acrylic fiber, a rayon fiber, a cupra fiber, a polylactrone fiber, cotton, silk or the like can be used.

The extensible optical signal transmission cable of the present invention can also be arranged with the conductor wire, in addition to the optical fiber.

The conductor wire preferably has an electric resistance of 100 Ω/m or less, more preferably 10 Ω/m or less, and particularly preferably 5 Ω/m or less, per 1 m of the extensible optical signal transmission cable in a loosened state.

The conductor wire to be used in the present invention is preferably an assembled wire of fine wires made of a substance with good electric conductivity. The assembled wire of metal fine wires is soft and is hard to break, and thus contributes to enhancement of extensity and durability of the extensible optical signal transmission cable.

As the conductor wire composing the signal wire, the fine wire can also be used alone, however, increased electric resistance decreases transmission property. Accordingly, it is preferable to use two or more fine wires in assembly as one conductor wire. The upper limit of the assembled number is not especially limited, and can be determined arbitrarily in consideration of flexibility and electric resistance. Increase in the assembled number decreases productivity, therefore, it is preferably 10000 or less, and more preferably 1000 or less.

The substance with good electric conductivity means an electric conductor with a resistivity of $1\times10^{-4}$ Ω·cm or lower, and more preferably a metal with that value of $1\times10^{-5}$ Ω·cm or lower. A specific example includes, what is called copper (a resistivity of $0.2\times10^{-5}$ Ω·cm) and aluminum (a resistivity of $0.3\times10^{-5}$ Ω·cm) or the like.

The copper wire is relatively cheap and has low electric resistance and is easy in making the fine wire, and thus is preferable. The aluminum wire has light weight, and thus is preferable next to the copper wire. The copper wire has generally been known as a soft copper wire or a tin copper alloy wire, however, a high strength copper alloy (for example, the one added with iron, phosphorous, indium or the like to oxygen-free copper) with enhanced strength, the one prevented oxidation by being plated with tin, gold, silver, platinum, or surface treated one with gold or other element to enhance transmission characteristics of an electrical signal, or the like can also be used, but it is not especially limited thereto.

Diameter of a single fine wire composing the conductor wire is preferably 0.1 mm or less, more preferably 0.08 mm or less, and still more preferably not larger than 0.05 mm or less. By making fine wire, flexibility can be enhanced. Still more, by making fine wire to skin effect specific to high frequency, surface area is increased and thus transmission property can be enhanced. Too fine wire tends to break the wire in processing, and thus it is preferable to be 0.01 mm or more.

There have been known various methods for assembling fine wires, and the assembly may also be performed in the present invention by any known method. However, because only pulling together in straight is difficult to wind, it is preferable to make a twisted wire. In addition, in order to exert flexibility, an assembled wire wound with the insulating fiber can also be used.

The conductor wire to be used in the present invention is preferably insulated as each of the fine wires or as the conductor wire. Thickness or kind of the insulating layer may be designed arbitrarily depending on applications of the extensible optical signal transmission cable.

The insulating material can be selected by taking insulating property, transmission property and flexibility in consideration. The insulating material can be selected arbitrarily from known insulating materials. In view of transmission property, a material with low dielectric constant is preferable, including the fluorine-based or polyolefin-based insulating material or the like. In view of flexibility, vinyl chloride-based and rubber-based insulating materials are included.

The insulating material containing air can also be used. In order to obtain the insulating material containing air, the one obtained by foaming the above insulating material can also be used. Air has low dielectric constant and has effect to decrease dielectric constant.

By covering the conductor wire with an assembly of insulating fibers, the insulating layer containing air can also be formed. The insulating fiber is not especially limited, however, there is included a polyester fiber and a nylon fiber, as a cheap one with high strength and is superior in handling. In order to enhance transmission property, a fluorofiber and a polypropylene fiber with low dielectric constant can also be used.

In order to make influence by water minimum, a fiber after water-repellent finishing can also be used.

The extensible optical signal transmission cable of the present invention can also retain air between each of the optical fibers and the conductor wires. Air has insulation property and a medium with low dielectric constant, and thus has effect to enhance transmission property. I order to make air maintain, it is also possible to intervene the filament made of the insulating fiber, or intervene a hollow tube, or cover the whole part with a foaming resin.

The extensible optical signal transmission cable of the present invention preferably has the transmission loss of the optical signal of 20 dB/m or less, in an arbitrary extended state till extension limit. The transmission loss over this range decreases signal transmission property, and makes signal transmission difficult. The transmission loss is more preferably 10 dB/m or less, still more preferably 6 dB/m or less, and particularly preferably 3 dB/m or less.

In the extensible optical signal transmission cable of the present invention, the optical fiber to be used as a signal line is preferably the optical fiber with small limit bending diameter. It is still more preferably the flexible and difficult-to-break optical fiber. As such an example, there is exemplified the holey-type, in the glass optical fiber, and the multi-core-type in the plastic optical fiber. In addition, such one can also be used that has decreased limit bending diameter or the one with enhanced deform resistance by a material of a core and a grid.

The extensible optical signal transmission cable of the present invention is preferably the one having high extension recovery rate. The recovery rate after 20% extension (20% extension recovery rate) is preferably 80% or more. The one which does not recover 80% or more after 20% extension decreases compliance with shape deformation. It is more preferably the one which recovers by 80% or more after 30% extension, and still more preferably the one which recovers by 80% or more after 40% extension.

The extensible optical signal transmission cable of the present invention is preferably the one which easily extends. Extension load under 20% extension is preferably below 5000 cN, more preferably below 2000 cN, still more preferably below 1000 cN, and particularly preferably below 500 cN. The one having the load of 5000 cN or more requires large load to make it extend, and thus is not preferable.

The extensible optical signal transmission cable of the present invention is preferably the one which does not break even by repeating predetermined extension in use 10,000 times or more, preferably 100,000 times or more, and more preferably 200,000 times or more, and has low decrease in transmission property. It is an object of the present invention to provide the extensible optical signal transmission cable superior in resistance to repetitive extension, and suitable for practical application.

The extensible optical signal transmission cable of the present invention can be produced by winding at least one or more optical fiber onto the elastic cylinder in an extended state, and winding a constrained filament around the outer side of said optical fiber in a opposite direction to said optical fiber, using an apparatus having function for extending the elastic cylinder, function for winding a plurality of transmission wires in parallel around the elastic cylinder, and function for winding the constrained filament in a reversed direction to a winding direction of the transmission wires.

More preferably, it is an aspect to provide a structure for constraining the transmission wire, by winding one or more transmission wires in parallel, as well as winding the constrained filament, by alternately passing through the inner side and the outer side of one or more transmission wires, in a reversed direction to the transmission wires, by means of making function for winding the constrained filament in a opposite direction to winding direction of the optical fiber, to function for being capable of winding the constrained filament, by alternately passing through the inner side (elastic cylinder side) and the outer side of the optical fiber. The apparatus to be used is not especially limited, as long as it has the above functions.

Major mechanisms which the apparatus having the above functions should be provided are as follows:

(1) mechanism to supply the elastic cylinder,
(2) mechanism for holding the elastic cylinder and feeding it at constant speed (preferably, mechanism for holding the elastic cylinder without nipping and feeding it at constant speed; mechanism for holding the elastic cylinder, in a character 8 state, along a V-groove of, for example, two-series rolls having a plurality of V-grooves, and feeding it),
(3) mechanism for holding the elastic cylinder and winding it at constant speed (preferably mechanism for holding the elastic cylinder without nipping and feeding it at constant speed; mechanism for holding the elastic cylinder, in a character 8 state, along a V-groove of, for example, two-series rolls having a plurality of V-grooves, and winding it; or mechanism for winding the elastic cylinder in a plurality of times along a V-groove of a large diameter drum having the V-groove, and winding it),
(4) mechanism for winding, in parallel, the transmission wire containing at least one or more optical fiber around the elastic cylinder, in a loosened state of the elastic cylinder (for example, mechanism for swirling a bobbin wound with the optical fiber or the filament around the elastic cylinder held; mechanism for winding the optical fiber or the filament around the elastic cylinder by rotating the elastic cylinder held; or mechanism for arranging, in series, a plurality of hollow bobbins wound with the optical fiber or the filament, and rotating the hollow bobbins while making the elastic cylinder passing through the hollow part of the hollow bobbins), and
(5) mechanism for winding, in parallel, the constrained filament around the elastic cylinder in a reversed direction of a winding direction of the optical fiber, in an extended state of the elastic cylinder; particularly preferably, mechanism for winding the constrained filament, by alternately passing through the outer side and the inner side of the optical fiber, in a reversed direction of a winding direction of the optical fiber, in an extended state of the elastic cylinder (for example, mechanism for transferring one or more bobbin wound with the optical fiber and one or more bobbin wound with the insulating filament, forward and backward or up and down, and swirling them around the elastic cylinder mutually in a reversed direction).

EXAMPLES

Explanation will be given below in detail on the present invention with reference to Examples and Comparative Examples, however, the present invention should not be limited to these Examples.

(1) Extensity

An extensible optical signal transmission cable is marked at an interval of 20 cm. After extending the mark positions up to 22 cm by holding outside of the extensible optical signal transmission cable with hands, it was loosened to measure length thereof. By distinguishing under the following criterion, a group (A) which was possible to extend up to 22 cm and recovered to less than 21 cm after loosening was judged to have an extensity of 10% or more:

A: the one which was possible to extend up to 22 cm and recovered to less than 21 cm after loosening.

B: the one which was not possible to extend up to 22 cm, or the one which was possible to extend up to 22 cm but did not recover to less than 21 cm even after loosening.

(2) Winding Diameter

Winding outer diameters were measured at three positions with a caliper, in a loosened state after winding the optical fiber to determine average value $D_0$ thereof. In addition, outer diameters of the optical fiber were measured at three positions with a caliper, to determine average value d thereof, and winding diameter D (mm) was determined by the following expression:

$$D=D_0-d$$

(3) Pitch Interval

Distance between arbitrary pitches of the same optical fiber was measured with a ruler to obtain pitch interval P (mm).

(4) Bending Diameter R (mm)

It was determined by the following expression:

$$R=(\sqrt{P^2+(\pi D)^2})/\pi$$

(5) Limit Bending Diameter (Re)

An optical fiber with a length of 1 m was connected to an Optopower meter (Photom 205A, manufactured by Graytechnos Co., Ltd.) to detect photo output before bending to be used as a standard.

Next, the optical fiber was wound 10 times without gap around an iron core with a predetermined diameter, and fastened it with a vinyl tape to measure a transmission loss, based on the standard, using the Optopower meter. In the case where the transmission loss was below 3 dB, the transmission loss was measured again by changing the iron core with smaller diameter.

By changing the iron core, from a larger one to a smaller one, by each 1 mm in the case where diameter of the iron core is 5 mm or more; by each 0.5 mm in the case where it is below 5 mm and 2 mm or more; and by each 0.2 mm in the case where it is below 2 mm, and either of a larger one of diameter showing the transmission loss of 3 to 5 dB, or diameter showing first break was adopted as De. Re was defined as value of this De added with diameter of the optical fiber d.

(6) Load at 20% Extension

After standing still a sample for 2 hours or more in a standard condition (a temperature of 20° C., a relative humidity of 65%), it was extended under condition of a sample holding length of 100 mm and an extension rate of 100 m/min, using a universal Tensilon meter (manufactured by A & D Co., Ltd.) under the standard condition, to determine load T20 (cN) at 20% extension.

(7) Recovery Property of Extension

After standing still a sample for 2 or more hours in a standard condition (a temperature of 20° C., a relative humidity of 65%), it was extended under condition of a sample holding length of 100 mm and an extension rate of 100 m/min, using a universal Tensilon meter (manufactured by A & D Co., Ltd.) under the standard condition, and by returning it after extension by predetermined extension rate to determine distance showing a load of zero (A mm (distance from extension zero point to the relevant position)), and recovery rate was determined by the following expression:

$$\text{Recovery rate}(\%) = ((100-A)/100) \times 100$$

Recovery was judged based on the following standard:
A: Recovery rate ≥ 80%
B: 80% > Recovery rate ≥ 50%
C: 50% > Recovery rate (8) Extension Limit The above extension recovery rate was measured by each 10% to determine extension rate showing below 80% (E80), and extension limit was determined by the following expression:

$$\text{Extension limit} = 0.8 \times E80$$

(9) Evaluation at 30% Extension

After standing still a sample for 2 or more hours in a standard condition (a temperature of 20° C., a relative humidity of 65%), it was extended under condition of a sample holding length of 100 mm and an extension rate of 100 m/min, using a universal Tensilon meter (manufactured by A & D Co., Ltd.) under the standard condition, and stopped the extension at the point where extension showed 30%, and the following data were collected:

1) winding diameter at extension Dx (mm): winding outer diameter of the optical fiber was measured with a caliper to determine winding diameter similarly as in the above (2).

2) pitch at extension Px (mm): pitch interval was measured with a ruler.

3) bending diameter at extension Rx (mm): bending diameter was measured using winding diameter and pitch similarly as in the above (4).

(10) Repetitive Extensity Resistance

Figure 6:
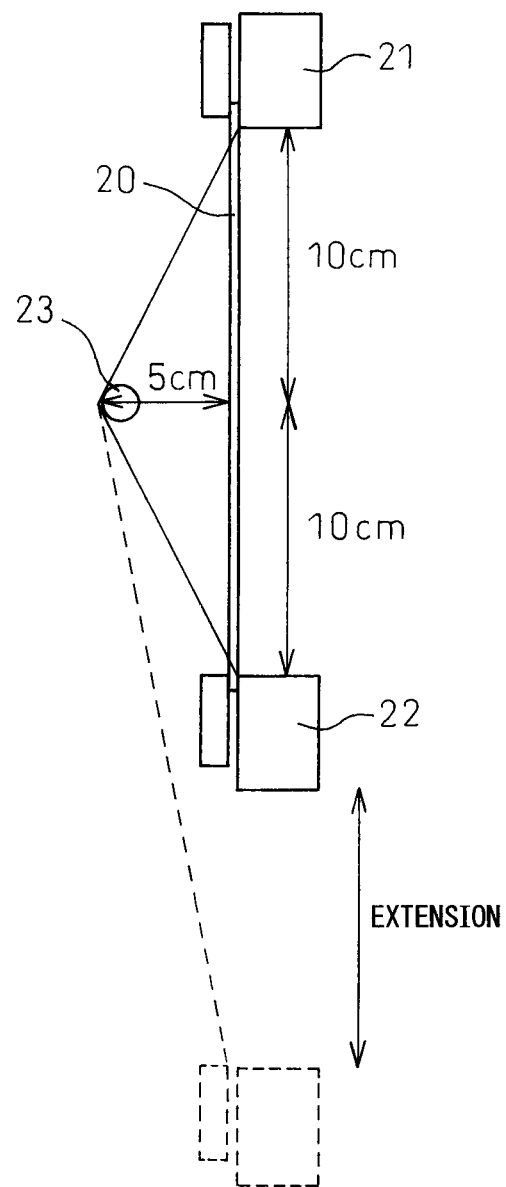
FIG. 6 is a schematic drawing of a repetitive extensity measuring device.

A chuck part (21) and a chuck part (22) of a De Mattia flexing tester (manufactured by Daiei Kagaku Seiki MFG. Co., Ltd.), shown in FIG. 6, were set at a sample length of 20 cm. The center part of the 50 cm sample attached with connectors at the both ends in advance, was set at the chuck part (21) and the chuck part (22) to measure pitch interval and variation between pitches Pr1 was determined. Next, as shown in FIG. 6, a stainless bar (23) with a diameter of 1.27 cm was arranged at the middle of the chuck part (21) and the chuck part (22). In this state, the both ends were connected to the Optopower meter (Photom 205A, a light source of 650 nm) to measure output P1.

Next, a movable position of the chuck part (22) was set at 26 cm, corresponding to a value of a sample in extension, to measure output P2, by repeating extension and contraction for 100,000 times in 100 times/min under condition of extension of 11% at initial and extension of 40% at stretching, at room temperature, and then stopping the sample at the initial extension position. Next, the stainless bar was removed to measure pitch interval variation Pr2 of the optical fiber. Repetitive extensity resistance was evaluated, based on the following standard:

| Pitch interval variation (Pr2-Pr1) | | Decrease in transmission property Transmission loss (dB) |
|---|---|---|
| A ≤0.1 | and | ≤3 dB |
| B >0.1 and ≤0.5 | or | >3 dB and ≤10 |
| C >0.5 | or | >10 dB |

It should be noted that transmission loss (dB) was determined by the following expression:

$$\text{Transmission loss}(dB) = 10 \times (\text{Log}(P2/P1))$$

(11) Twisting Resistance

A twisting test was performed for 10 minutes, where twisting was repetitive 175 times/minute, by holding both ends of a sample at a holding length of 100 mm, and twisting one end by a rotation of 135 degree to the right, and the other end by a rotation of 135 degree to the left, and then form abnormality (bias of pitch, protrusion of the optical fiber) was observed visually to measure decrease in transmission property before and after the twisting test, by a similar method as in the above (10). Twisting resistance was evaluated, based on the following standard:

Twisting Resistance/Abnormal Form/Decrease in Transmission Property

| A: | N | and | ≤3 dB |
| B: | N | and | >3 dB and ≤10 |
| C: | Y | or | >10 dB |

(12) Drop Resistance of Extensity

At one end of a sample with a length of 50 cm, a load of 5 kg was connected and the other end was fixed at a height of 100 cm, and the side connected with the load was subjected to free fall. A state after the fall was observed to evaluate fall resistance, based on the following standard:

A: No breaking of wire of the optical fiber, and elongation of length is less than 10%.
B: No breaking of wire of the optical fiber, and elongation of length is 10% or more.
C: Breaking of wire of the optical fiber.

(13) Transmission Property in Extension and Contraction

Marks were put at the both sides of 200 mm from the center part of a sample with a length of 1 m, attached with connectors at the both ends in advance, in a loosened state (a vinyl tape was wound). In this state, the connectors at the both ends were attached to the Optopower meter (Photom 205A, manufactured by Graytechnos Co., Ltd., a light source of 650 nm, 310-065CF (manufactured by Graytechnos Co., Ltd.)) and a W/dBm button was pushed to measure output P0 (μW).

Next, outputs Ps10, Ps20, - - - were measured by holding the marked parts with hands to extend them by each 10 mm, such as 210 mm, 220 mm - - - -. After extending the sample to the extension limit, outputs of - - - Pr20, Pr10 were measured while contracting by each 10 mm. Transmission property I in extension and contraction was determined by the following expression:

$$I=(Pmax-Pmin)/Pave$$

[wherein Pmax represents maximum output, Pmin represents minimum output, and Pave represents average output. It should be noted that Pave was determined as Pave=(Ps10+Ps20+- - - +Pr20+Pr10)/measurement points number], and transmission property in extension and contraction was evaluated, based on the following standard:

A: 0<I≤0.3
B: 0.3<I≤3
C: 3<I

(14) Transmission Loss (L (dB))

Transmission loss was determined as follows

Measurement apparatus: Optopower meter: photom 205A (manufactured by Graytechnos Co., Ltd.)

Light source: 650 nm, 310-065CF (manufactured by Graytechnos Co., Ltd.)

Connector adapter: 180-HTL

Measurement method: A cut back method (Output P1 was measured by mounting the extensible optical signal transmission cable with a length of L1 (m) in a loosened state onto the measurement apparatus. Next, said cable was cut at a point of L2 (m) from a light source and mounted onto the measurement apparatus to measure output P2. Transmission loss was determined as following expression $$\text{Transmission loss(dB)}=10\times(\text{Log}(P2/P1))/(L1-L2)$$

(15) Electric Resistance

A sample with a length of 1 m was cut out in a loosened state, a tip of the conductor wire at both ends thereof was pulled out by about 5 mm, and the tip of about 3 mm was immersed into a solder bath to enhance electric continuity between fine wires, and then electric resistance (Ω) was measure using a Milliohm High Tester 3540 (manufactured by Hioki E.E. Corp.).

(16) Residual Torque Rate

After standing still a sample for 2 hours or longer in a standard condition (a temperature of 20° C., a relative humidity of 65%), the ten turned optical fiber (1 turn means 1 pitch) was cut out from the sample, and it was unwound without stretching the optical fiber, and stood still under the standard condition.

After 10 minutes, the number of turns (N) was measured to determine residual torque rate by the following expression:

$$\text{Residual torque rate}=100*(10-N)/10(\%)$$

Examples 1 to 5 and Comparative Example 1

1) Preparation of an Elastic Cylinder

A double-cover yarn was obtained by winding 230 dtex Woolly Nylon (yarn dyed in black) by a first twist of 700 T/M, and a final twist of 500 T/M, under an extension magnification of 4.2 times, using a 940 dtex polyurethane elastic filament yarn (trade name: Roica, produced by Asahi Kasei Fibers Corp.) as a core. The resultant double-cover yarn was reeled to a bobbin for cord manufacturing, and said four bobbins were arranged uniformly to an eight strings braiding machine (manufactured by Sakurai Iron Works, Ltd.) by two bobbins in an S direction and two bobbins in a Z direction, to obtain an elastic cylinder (A) with a diameter of 1.8 mm.

An elastic cylinder (B) with a diameter of 2.4 mm was obtained by performing covering using the relevant elastic cylinder as a core and 230 dtex Woolly Nylon, under 2.4 times extension, with a 16 strings braiding machine. An intermediate elastic cylinder was obtained by performing braiding eight strings of the above double cover yarns, using an 8 strings braiding machine. An elastic cylinder (C) with a diameter of 3.2 mm was obtained by performing external covering, using the relevant elastic cylinder as a core and 16 bobbins wound with 2 strings of 230 dtex woolly nylon in alignment, under 2.4 times extension, and using a 16 strings braiding machine. Still more, an elastic cylinder (D) with a diameter of 4 mm was obtained by performing external covering, using the relevant elastic cylinder as a core and 16 bobbins wound with 3 strings of 230 dtex woolly nylon in alignment, under 2.2 times extension. An elastic cylinder (E) with a diameter of 5 mm was obtained by performing covering, using natural rubber (No. 8) as a core, a bobbin wound with 3 strings of 230 dtex woolly nylon in alignment, under 3 times extension, and a 32 strings braiding machine.

2) Winding of the Optical Fiber

Extensible optical signal transmission cables of the present invention were obtained, by winding three optical fibers (Luminous™, commercial name: SMCN-400P-6, produced by Asahi Kasei Electronics Co., Ltd.: diameter, 0.4 mm; 0.05 to 0.06 mmΦ×37 pieces) in an S direction, and four ester woolies (330 dtex) in a Z direction, by mutually passing through the inner side and the outer side, around the elastic cylinder, under extension of 2.0 times, using a special braiding machine (a special braiding machine equipped with (1) mechanism for supplying the elastic cylinder as a core part, (2) mechanism for holding the elastic cylinder, in a character 8 state, along a V-groove of two-series rolls having a plurality of V-grooves, and feeding it, (3) mechanism for holding the elastic cylinder, in a character 8 state, along a V-groove of two-series rolls having a plurality of V-grooves, and winding it, (4) mechanism for winding, in parallel, the optical fiber around the elastic cylinder, in a loosened state of the elastic cylinder, and (5) mechanism for winding the constrained filament around the elastic cylinder in an extended state, by alternately passing through the inner side and the outer side of the optical fiber, in a reversed direction to a winding direction of the optical fiber). Composition and evaluation results of the resultant extensible optical signal transmission cable are shown in the following Table 1.

Example 6

A bobbin front-wound with the optical fiber was set at the lower stage of a special covering machine (Model SP-D-400, manufactured by Kataoka Techno Co., Ltd., a covering machine equipped with (1) mechanism for supplying the elastic cylinder of a core part, (2) mechanism for holding the elastic cylinder, in a character 8 state, along a V-groove of two-series rolls having a plurality of V-grooves, and feeding it, (3) mechanism for holding the elastic cylinder, in a character 8 state, along a V-groove of two-series rolls having a plurality of V-grooves, and winding it, (4) mechanism for winding, in parallel, the optical fiber around the elastic cylinder, in a loosened state of the elastic cylinder, and (5) mechanism for winding the constrained filament, in a reversed direction to a winding direction of the optical fiber, in an extended state of the elastic cylinder). The optical fiber was wound by a final twist of 160 T/M in a Z direction, using said special covering machine, with an elastic cylinder (B) as a core, while extending the relevant core part to three times. Then, by winding it onto a paper tube continuously under a loosening rate of 70%, and in this state wound onto the paper tube, it was put into a hot air dryer at 85° C. for 5 minutes to perform heat treatment. After cooling, it was taken out from the paper tube to obtain the extensible optical signal transmission cable of the present invention. Composition and evaluation results of the resultant extensible optical signal transmission cable are shown together in the following Table 1.

TABLE 1

| | Composition | | | | | | | |
|---|---|---|---|---|---|---|---|---|
| | Core part | | | Transmission part Optical fiber | | | | |
| | Elastic cylinder | | | | | | Winding state | |
| | | Exyensity | | | | | | in a loosened state |
| No. | 10% extensity | 100% extension recovery rate (%) | Product name | Limit bending diameter (Re) (mm) | Diameter (d) (mm) | Constrained filament Number (piece) | Average winding diameter (D) (mm) | Average pitch (P) (mm) |
| Example 1 | A | A | 98 | SMCN-400 P-6 | 1.4 | o.6 | 8 | 2.5 | 7 |
| Example 2 | B | A | 98 | | | | 8 | 3.0 | 7 |
| Example 3 | C | A | 98 | | | | 8 | 3.8 | 8 |
| Example 4 | D | A | 98 | | | | 8 | 4.6 | 8 |
| Example 5 | E | A | 98 | | | | 8 | 5.6 | 10 |
| Example 6 | D | A | 98 | | | | 0 | 4.8 | 8 |
| Comparative Example 1 | A | A | 98 | | | | 8 | 2.4 | 3 |

| | Composition Transmission part Optical fiber Winding state | | | | | | | |
|---|---|---|---|---|---|---|---|---|
| | in a loosened state | | | in 30% extension | | | | |
| | Average bending diameter (Rave) (mm) | Minimum bending diameter (Rmin) (mm) | Bending diameter variation (Rr) (mm) | Average winding diameter (D) (mm) | Average pitch (P) (mm) | Average bending diameter (Rave) (mm) | Minimum bending diameter (Rmin) (mm) | Bending diameter variation (Rr) (mm) |
| Example 1 | 3.4 | 3.3 | 0.1 | 2.1 | 9 | 3.8 | 3.7 | 0.2 |
| Example 2 | 3.7 | 3.6 | 0.4 | 2.6 | 9 | 3.9 | 3.6 | 0.6 |
| Example 3 | 4.5 | 4.4 | 0.2 | 3.3 | 10 | 4.6 | 4.4 | 0.4 |
| Example 4 | 5.3 | 5.2 | 0.1 | 4.0 | 10 | 5.2 | 5.2 | 0.1 |
| Example 5 | 6.4 | 6.3 | 0.3 | 4.9 | 13 | 6.4 | 6.2 | 0.5 |
| Example 6 | 5.3 | 4.8 | 1.0 | 4.2 | 10 | 5.1 | 4.4 | 1.4 |
| Comparative Example 1 | 2.6 | 2.5 | 0.2 | 2.1 | 4 | 2.5 | 2.4 | 0.2 |

| | Performance | | | | | | | |
|---|---|---|---|---|---|---|---|---|
| | Extensity of cable | | | | Transmission property | | Durability | |
| | 10% extensity | 20% extension load (cN) | 20% extension recovery rate (%) | Extension limit (%) | Transmission loss in loosened state (dB/m) | Transmission property extension | Repetitive extension resistance | Twisting resistance |
| Example 1 | A | 210 | 93 | 30 | 6.7 | A | B | A |
| Example 2 | A | 250 | 92 | 40 | 7.2 | A | A | A |
| Example 3 | A | 440 | 93 | 40 | 5 | A | A | A |
| Example 4 | A | 490 | 92 | 50 | 4.2 | A | A | A |
| Example 5 | A | 780 | 93 | 50 | 3.8 | A | A | A |
| Example 6 | A | 450 | 92 | 40 | 6.5 | B | B | B |
| Comparative Example 1 | A | 240 | 90 | 40 | >30 | — | — | — |

From Table 1, it is understood that the extensible optical transmission cable of the present invention is an optical signal transmission cable which can use under repetitive extension and contraction, can transmit an optical signal even in extension and contraction, and is resistant to twisting.

Example 7

Similarly as in Example 6, an optical fiber was wound by a final twist of 130 T/M in a Z direction, and 330 dtex ester woolly was wound by a first twist of 170 T/M in an S direction, using the elastic cylinder (B) as a core. Then, by winding this onto a paper tube continuously under a loosening rate of 70%, and in this wound state onto the paper tube as it is, it was put into a hot air dryer at 85° C. for 5 minutes to perform heat treatment. After cooling, this was taken out from the paper tube to obtain the extensible optical signal transmission cable of the present invention.

Residual torque rates before and after heat treatment were studied and found that they were 70% and 20% before the heat treatment and after the heat treatment, respectively. From this result, it is understood that heat treatment is effective for significantly decreasing residual torque rate.

Example 8

An extensible optical signal transmission cable having an external covering layer was obtained by performing external covering of 3000 dtex ester woolly, under 1.2 times extension and 90 T/m (a winding number of 90 times per m), using the extensible optical signal transmission cable obtained in Example 2 as a core, with a special braiding machine described in Example 1. The relevant cable was cut out by 100 mm, and disassembled to study length of the optical fiber and the ester woolly. Length of the optical fiber was 171 mm, and length of the ester woolly was 155 mm. It should be noted that load for one said ester woolly at 10% (100×(171−155)/155) extension was 1800 N. Therefore, total load for 16 pieces was 28800 N.

Example 9

An extensible optical signal transmission cable of the present invention was obtained, by extending the elastic cylinder B by 1.6 times, using a special braiding machine described in Example 1, and feeding three pieces of aramid fibers (Kevlar™ Type 440 dtex) in alignment, to a core part in said extended state, to prepare a core of the elastic cylinder and the aramid fiber in combination, and by winding the optical fiber and the ester fiber around said core, similarly as in Example 1. Said cable was cut out by 100 mm, and disassembled to study length of the optical fiber and the aramid fiber. Length of the optical fiber was 174 mm, and length of the aramid fiber was 151 mm. It is understood that the aramid fiber is shorter by 9% than the optical fiber. It should be noted that said aramid fiber had a rupture elongation of 5% and a breaking load of 8300 cN. Load under 5% breaking load of three cables was 24900 cN. Therefore, it is understood that the aramid fiber received extension load before it is loaded onto the optical fiber, and thus extension resistant effect is exerted.

Evaluation results of fall extensibility resistance on samples of Examples 7 to 9 are shown in the following Table 2.

TABLE 2

| | Composition | | | | | | | | |
|---|---|---|---|---|---|---|---|---|---|
| | Core part Elastic cylinder | | | Transmission part Optical fiber | | | | | |
| | extensity | | | | | Winding state (in a loosened state) | | | |
| No. | 10% extensity | 100% extensity recovery rate (%) | Product name | Limit bending diameter (Re) (mm) | Diameter (d) (mm) | Constrained filament Number (piece) | Average winding diameter (D) (mm) | Average pitch (P) (mm) | Average bending diameter (Rave) (mm) |
| Example 7 | B | A | 98 | SMCN-400 P-6 | 1.4 | 0.6 | 1 | 3.5 | 9 | 4.5 |
| Example 8 | | | | | | | 8 | 3.1 | 7 | 3.9 |
| Example 9 | | | | | | | 8 | 3.1 | 7 | 3.8 |

| | Composition | | | | | | | |
|---|---|---|---|---|---|---|---|---|
| | Transmission part Optical fiber | | | Extension resistant part Extension resistant filament | | | | |
| | Winding state (in a loosened state) | | | | | Total | Property | |
| | | | | | | | Breaking load | |
| | Minimum bending diameter (Rmin) (mm) | Bending diameter variation (Rr) (mm) | Total length of optical fiber/1 m cable (m) | Product name | Pieces used (piece) | length of extension resistant filament/ 1 m cable (m) | or load in extension till optical fiber length/ 1 piece (cN) | Extension resistant total load (cN) |
| Example 7 | 3.7 | 1.6 | 160 | None | — | — | — | — |
| Example 8 | 3.6 | 0.5 | 171 | Ester Wooly (330 dtex) | 16 | 155 | 1800 | 28800 |
| Example 9 | 3.6 | 0.4 | 174 | Aramide (440 dtex) | 3 | 151 | 8300 | 24900 |

TABLE 2-continued

| | | Performance | | | | | | |
|---|---|---|---|---|---|---|---|---|
| | | Extensity of cable | | | Transmission property | | Durability | |
| | | | 20% | | Transmission | | | |
| | 10% extensity | 20% extension load (cN) | extension recovery rate (%) | Extension limit (%) | loss in loosened state (dB/m) | Transmission property in extension | Fall extemsibility resistance | Repetitive extension resistance |
| Example 7 | A | 230 | 92 | 50 | 6.4 | B | B | B |
| Example 8 | A | 280 | 92 | 30 | 7.2 | A | A | A |
| Example 9 | A | 290 | 92 | 30 | 7.3 | A | A | A |

From Table 2, it is understood that by having the extension resistant filament, fall extensibility resistance enhances and the optical fiber, which does not break even by temporary abrupt force, can be obtained.

Examples 10 to 12

Extensible optical signal transmission cables of the present invention were obtained by using a predetermined elastic cylinder as a core, under extension of 1.6 times, using a special braiding machine described in Example 1, and by winding a predetermined number of the optical fibers and 330 dtex ester woolly uniformly in an S direction, and four 330 dtex ester woolly uniformly in a Z direction, by alternately passing through the upper part and the lower part.

Evaluation results of the resultant extensible optical signal transmission cables are shown in the following Table 3.

TABLE 3

| | Composition | | | | | | | |
|---|---|---|---|---|---|---|---|---|
| | Core part | | | Transmission part Optical fiber | | | | |
| | Elastic cylinder | | | | | Winding state | | |
| | No. | 10% extensity | 100% extensity recovery rate (%) | Product name | Limit bending diameter (Re) (mm) | Diameter (d) (mm) | Winding Number (mm) | Constrained filament Number (piece) | Average winding diameter (D) (mm) |
| Example 10 | C | A | 98 | SMCN-P-6 | 1.4 | 0.6 | 2 | 4 | 3.8 |
| Example 11 | D | A | 98 | | | | 3 | 4 | 4.6 |
| Example 12 | E | A | 98 | | | | 4 | 4 | 5.6 |

| | Composition Transmission part Optical fiber | | | | | Performance | |
|---|---|---|---|---|---|---|---|
| | Winding state | | | | | Extensity of cable | |
| | Average pitch (P) (mm) | Average bending diameter (Rave) (mm) | Minimum bending diamter (Rmin) (mm) | Bending diameter variation (Rr) (mm) | Distance between wires | | 20% |
| | | | | | Minimum (mm) | Maximum (mm) | 10% extensity | extention load (cN) |
| Example 10 | 8 | 4.5 | 4.4 | 0.2 | 1.9 | 2.5 | A | 480 |
| Example 11 | 11 | 5.8 | 5.7 | 0.3 | 1.3 | 1.7 | A | 580 |
| Example 12 | 13 | 6.9 | 6.8 | 0.2 | 0.5 | 0.7 | A | 880 |

| | Performance | | | | |
|---|---|---|---|---|---|
| | Extensity of cable | | Transmission property | | Durability |
| | 20% extention recovery rate (%) | Extension limit (%) | Transmission loss in loosened state (dB/m) | Transmission property in extension | Repetitive extension resistance |
| Example 10 | 92 | 40 | 5 | A | A |
| Example 11 | 91 | 40 | 3.5 | A | A |
| Example 12 | 87 | 40 | 2.2 | A | A |

Examples 13 to 16

Extensible optical signal transmission cables of the present invention were obtained by using a predetermined elastic cylinder as a core, under extension of 1.6 times, using a special braiding machine described in Example 1, and by winding a predetermined number of the optical fibers, a predetermined number of the conductor wires (2USTC (30μ*90 pieces), manufactured by Tatsuno Wire Co., Ltd.), and a predetermined number of the 330 dtex ester woolly, in an S direction, in the order of the optical fibers, the conductor wires, ester woolly and the conductor wires, and four ester woollies in a Z direction, by alternately passing through the upper part and the lower part. The extensible optical signal transmission cables, which can supply an optical signal, power and an electrical signal at the same time, were obtained.

Evaluation results of the resultant extensible optical signal transmission cables are shown in the following Table 4.

Example 17

The extensible optical signal transmission cable obtained in Example 2 was subjected to heat treatment under a hot air dryer (85° C.) for 10 minutes. After cooling the sample at room temperature for 18 hours, the extensible optical signal transmission cable of the present invention (Example 17) was obtained. Residual torque rates of the samples of Example 17 and Example 2 were measured and found that they were 50% and 20% in Example 2 and Example 17, respectively. 20% extension recovery property was 92% and 95% in Example 2 and Example 17, respectively. From this result, it is understood that heat treatment is effective for enhancing also extension recovery property.

Industrial Applicability

The extensible optical signal transmission cable of the present invention, starting with a robot field, is suitable as a signal wire of an apparatus having a bending part for such as bending-extending, such as a wearable device and a device

TABLE 4

| | Composition | | | | | | | | |
|---|---|---|---|---|---|---|---|---|---|
| | Core part Elastic cylinder | | | Transmission part Optical fiber | | | | | |
| | extensity | | | | | Winding state | | | |
| | No. | 10% extensity | 100% extensity recovery rate (%) | Product name | Limit bending diameter (Re) (mm) | Diameter (d) (mm) | Winding Number (mm) | Constrained filament Number (piece) | Average winding diameter (D) (mm) | Average pitch (P) (mm) |
| Example 13 | C | A | 98 | SMCN-400 P-6 | 1.4 | 0.6 | 1 | 4 | 3.8 | 8 |
| Example 14 | D | A | 98 | | | | 1 | 4 | 4.6 | 8 |
| Example 15 | D | A | 98 | | | | 2 | 4 | 4.6 | 8 |
| Example 16 | E | A | 99 | | | | 2 | 4 | 5.6 | 10 |

| | Composition Transmission part | | | | | | | |
|---|---|---|---|---|---|---|---|---|
| | Optical fiber Winding state | | | conductor wire | | | | Performance Extensity of cable |
| | Average bending diameter (Rave) (mm) | Minimum bending diameter (Rmin) (mm) | Bending diameter variation (Rr) (mm) | Product Name (mm) | Winding Number (mm) | Distance between wires | | 10% extensity | 20% extention load (cN) |
| | | | | | | Minimum (mm) | Maximum (mm) | | |
| Example 13 | 4.5 | 4.4 | 0.2 | USTC90/ 0.03 | 2 | 1 | 1.3 | A | 440 |
| Example 14 | 5.5 | 5.5 | 0.1 | | 4 | 0.1 | 0.1 | A | 500 |
| Example 15 | 5.3 | 5.2 | 0.1 | | 2 | 0.1 | 0.2 | A | 560 |
| Example 16 | 7.5 | 7.4 | 0.2 | | 4 | 0.1 | 0.2 | A | 780 |

| | Performance | | | | | | |
|---|---|---|---|---|---|---|---|
| | Transmission property | | | | | | |
| | Extensitiy of cable | | Transmission | | Electric | High frequency | |
| | 20% extention recovery rate (%) | Extension limit (%) | loss in loosened state (dB/m) | Transmission property in extension | resistance in loosened state (mΩ/m) | loss in loosened state (dB/m) | Durability Repetitive extension resistance |
| Example 13 | 93 | 40 | 6.2 | A | 360 | — | A |
| Example 14 | 94 | 30 | 3.1 | A | 350 | 6 | A |
| Example 15 | 92 | 30 | 3 | A | 440 | — | A |
| Example 16 | 93 | 30 | 2.1 | A | 430 | 6 | A | attached to clothing, in particular, suitable for a humanoid-type robot (inner wire and integument wire), power assist apparatus and a wearable electronics device. In addition to these applications, the extensible optical signal transmission cable of the present invention can be utilized suitably in the fields of various robots (industrial robots, home robots, hobby robots and the like), rehabilitation aids, a measurement apparatus of vital data, a motion capture, protecting cloth with an electronic device, game controllers (including a wearable type) and micro-headphones and the like.

| LEGEND | |
|---|---|
| 1 | Elastic cylinder |
| 2 | Optical fiber |
| 3 | Optical fiber |
| 4 | Constrained filament |
| 20 | Sample |
| 21 | Chuck part |
| 22 | Chuck part |

The invention claimed is:

1. An extensible optical signal transmission cable having an extensity of 10% or more and an optical transmission loss of less than 20 dB/m when the cable is loosened, characterized in that the cable comprises an elastic cylinder having the extensity of 10% or more, at least one optical fiber wound around said elastic cylinder, and a constrained filament wound in a reverse direction of the optical fiber by alternately passing through the outer side and the inner side (elastic cyclinder side) of the optical fiber, wherein bending diameter R of said optical fiber is not smaller than limit bending diameter Re, and variation Rr (Rr=Rmax−Rmin) of bending diameter is 0≤Rr≤Rave.

2. The extensible optical signal transmission cable according to claim 1, wherein residual torque rate of an optical fiber is 70% or less.

3. The extensible optical signal transmission cable according to claim 1, wherein Rmin>Re and 0≤Rr≤Rave in an arbitrary extended state till extension limit.

4. The extensible optical signal transmission cable according to claim 1, wherein winding diameter of an optical fiber is 0.5 to 30 mm, and winding pitch of the optical fiber is 0.5 to 50 mm.

5. The extensible optical signal transmission cable according to claim 1, further comprising at least one conductor wire.

6. The extensible optical signal transmission cable according to claim 1, wherein at least one or more conductor wire is further wound.

7. The extensible optical signal transmission cable according to claim 6, wherein at least one or more optical fiber and at least one or more conductor wire are further wound concentrically.

8. The extensible optical signal transmission cable according to claim 6, wherein at least one or more optical fiber and at least one or more conductor wire are wound in the same circumference and in parallel.

9. The extensible optical signal transmission cable according to claim 1, further comprising an external covering layer made of a fiber at the outer periphery of the extensible optical signal transmission cable.

10. The extensible optical signal transmission cable according to claim 1, further comprising an external covering layer made of a resin having rubber elasticity at the outer periphery of the extensible optical signal transmission cable.

11. The extensible optical signal transmission cable according to claim 1, comprising one or more extension resistant filament with a total length smaller than an optical fiber, wherein breaking strength of said filament total is 10000 cN or more, when said filament is extended to a value defined by the following expression:

$$100(L_0-Lk)/Lk[\%]$$

wherein $L_0$ represents total length of the optical fiber, and $Lk$ represents total length of the extension resistant filament.

12. The extensible optical signal transmission cable according to claim 1, wherein 20% extension load is below 5000 cN, and 20% extension recovery rate is 80% or more.

13. A method for producing the extensible optical signal transmission cable according to any one of claims 1 and 2 to 12, characterized in that at least one optical fiber and at least one filament are wound around said elastic cylinder in the same direction in an extended state of the elastic cylinder, and still more, at least one constrained filament is wound by alternately passing through the outer side and the inner or the elastic cylinder side of one or a plurality of the optical fibers, in a reversed direction to said optical fiber, using an apparatus having function for extending the elastic cylinder, function for winding at least one transmission wire and at least one filament around said elastic cylinder in the same direction, and function for winding at least one constrained filament in a reverse direction to the above direction.

* * * * *

UNITED STATES PATENT AND TRADEMARK OFFICE
CERTIFICATE OF CORRECTION

PATENT NO.         : 8,693,829 B2
APPLICATION NO.    : 13/142233
DATED              : April 8, 2014
INVENTOR(S)        : Shunji Tatsumi et al.

Page 1 of 1

It is certified that error appears in the above-identified patent and that said Letters Patent is hereby corrected as shown below:

In the Claims

Claim 1, Col. 31, line 32, "cyclinder" should read --cylinder--.

Signed and Sealed this
Third Day of February, 2015

Michelle K. Lee
*Deputy Director of the United States Patent and Trademark Office*